United States Patent
Aldover et al.

(10) Patent No.: US 10,304,302 B2
(45) Date of Patent: May 28, 2019

(54) ELECTRONIC MONITORING SYSTEM USING PUSH NOTIFICATIONS

(71) Applicant: Netgear, Inc., San Jose, CA (US)

(72) Inventors: Dennis Aldover, Carlsbad, CA (US); Alexandr Losikov, San Jose, CA (US); Nathan Becker, San Jose, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 77 days.

(21) Appl. No.: 15/581,842

(22) Filed: Apr. 28, 2017

(65) Prior Publication Data
US 2018/0315282 A1    Nov. 1, 2018

(51) Int. Cl.
*G06K 9/62* (2006.01)
*H04N 5/77* (2006.01)
*H04N 7/18* (2006.01)
*G08B 25/10* (2006.01)
*G08B 25/14* (2006.01)
*G08B 13/196* (2006.01)

(52) U.S. Cl.
CPC ..... *G08B 13/19695* (2013.01); *G06K 9/6202* (2013.01); *G08B 25/10* (2013.01); *G08B 25/14* (2013.01); *H04N 5/77* (2013.01); *H04N 7/181* (2013.01); *H04N 7/188* (2013.01)

(58) Field of Classification Search
CPC ........... G08B 13/19695; G06K 9/6202; H04N 5/772; H04N 7/188
See application file for complete search history.

(56) References Cited

U.S. PATENT DOCUMENTS

| | | | |
|---|---|---|---|
| 8,612,534 B1 | 12/2013 | Hossack | |
| 9,319,473 B2 | 4/2016 | Zadorozny et al. | |
| 9,420,331 B2 | 8/2016 | Laska et al. | |
| 9,479,822 B2 | 10/2016 | Laska et al. | |
| 9,807,349 B1* | 10/2017 | Daniel | H04N 7/18 |
| 2010/0073169 A1* | 3/2010 | Needham | A61J 7/0481 340/573.1 |
| 2012/0260215 A1 | 10/2012 | Fennel | |
| 2012/0314901 A1 | 12/2012 | Hanson et al. | |

(Continued)

OTHER PUBLICATIONS

CCTV Camera Pros; Zavio IP Cameras with Push Video Notification; http://www.cctvcameraproscom/IP-Cameras-Push_Video-s/719.htm; Apr. 28, 2017; pp. 1-15.

(Continued)

*Primary Examiner* — Tracy Y. Li
(74) *Attorney, Agent, or Firm* — Boyle Fredrickson, S.C.

(57) ABSTRACT

An electronic monitoring system having one or more recording devices can be configured to detect a triggering event based on motion and/or sound and concurrently provide a rich push notification to a remote device for quickly viewing and/or monitoring the event via the push notification without requiring the remote device to execute a dedicated application program. The push notification can operate as a pop up message which can be pushed to the device and displayed via an operating system of the device. By providing event details in the push notification, such as a recorded image from the triggering event, and by providing dynamic updates with respect to the same push notification, which can include live and/or recorded event viewing, the monitoring system can be greatly improved.

20 Claims, 4 Drawing Sheets

(56) References Cited

U.S. PATENT DOCUMENTS

| | | |
|---|---|---|
| 2013/0222598 A1 | 8/2013 | Tomar et al. |
| 2015/0237151 A1 | 8/2015 | Lau et al. |
| 2016/0057457 A1 | 2/2016 | Clements et al. |
| 2016/0125714 A1* | 5/2016 | Kates .............. G08B 13/19669 386/228 |
| 2016/0180667 A1 | 6/2016 | Bunker et al. |

OTHER PUBLICATIONS

CCTV Camera Pros; IP Camera Mobile Push Notification Alert Setup; http://www.cctvcamerapros.com/IP-Camera-Motion-Push-Notification-s/917.htm; Apr. 28, 2017; pp. 1-15.

SKJM; lCam 1.3—New Feature: Record on Motion; http://skjm/lcam/vid.php?id=3; Apr. 28, 2017; pp. 1-2.

AAC Group; Push Video Overview; http://aacgroup.com.my/featured/pushvideo/; Apr. 28, 2017; pp. 1-3.

Google; Motion Detector Pro; https://play.google.com/store/apps/details?id=dk.mvainformatics.android.motiondetectorpro.activity&hl=en; Apr. 28, 2017; pp. 1-4.

Google; Push Video Showcase; https://play.google.com/store/apps/details?id=com.incoming.pvncompanion&hl=en; Apr. 28, 2017; pp. 1-2.

Niemanlab; Mic is Now Sending iPhone Push Notifications with Videos that Play Right on the Lock Screen; Lichterman, Joseph; http://www.niemanlab.org/2016/11/mic-is-now-sending-iphones-push-notifications-with-videos-that-play-right-on-the-lock-screen/; Nov. 3, 2016; pp. 1-10.

Android Developers; Updating Notifications; https://developer.android.com/training/notify-user/managing/html; Apr. 28, 2017; pp. 1-2.

GIPHY; Animated GIF—Find & Share on GIPHY; https://glphy.com/gifs/R4bopz1HbMLzW?utm_source=iframe&utm_medium=embed&utm_campaign=tag_click; Apr. 28, 2017; pp. 1-2.

Youtube; (CCTV + Alarm) = ICCTV Push Video to Your Smart Handphone; Kedaicctv; https://www.youtube.com/watch?v=jsLXcnrgXW0; Nov. 20, 2013; pp. 1-2.

Youtube; Avtech Push Video = Your Personal Guard; AVTECH Channel; https://www.youtube.com/watch?v=9kEpqqhOvrY; Aug. 28, 2013; pp. 1-2.

* cited by examiner

ELECTRONIC MONITORING SYSTEM USING PUSH NOTIFICATIONS

BACKGROUND OF THE INVENTION

1. Field of the Invention

The present invention relates to an electronic monitoring system, and more particularly, to an electronic monitoring system in which detection of a triggering event causes a rich push notification to be sent to a monitoring device which can allow the monitoring device to view and/or monitor the triggering event via the push notification.

2. Discussion of the Related Art

Cameras have long been used as part of monitoring and/or surveillance systems. More recently, cameras have been coupled with electronic sensors to detect triggering events, such as a detected motion, to allow recording of an area once a triggering event has occurred. Video cameras have also been connected to computers with network access to allow a user to remotely monitor an area with a monitoring device such as a smart phone or tablet computer. In such systems, push notifications can be sent to alert a user of a monitoring device of an event of interest. Upon receiving the push notification, the user can tap the push notification to open a dedicated application program for interacting with video cameras and/or other aspects of the monitoring system.

However, in such systems, opening a dedicated application program of the monitoring device to obtain more information about what may have occurred can be undesirable. For some devices, this requirement could result in excess delay, inefficiency and/or a potential crash during a time in which immediate access to the system is highly important. Users may also be disinclined to bother to check their device if they have to open an application simply to determine whether a triggering event is really of interest. What is needed is an improved system that eliminates one or more of the foregoing disadvantages.

SUMMARY OF THE INVENTION

An electronic monitoring system having one or more recording devices can be configured to detect a triggering event based on motion and/or sound and concurrently provide a rich push notification to a remote device for quickly viewing and/or monitoring the event via the push notification without requiring the user to execute a dedicated application program on the remote device. The push notification can operate as a pop-up message which can be pushed to the device and displayed via an operating system of the device. The push notification can be a "rich" push notification that provides media, such as images, video and/or sound, and interaction with such media, which does not normally correspond to a push notification. By providing event details in the push notification, such as a recorded image from the triggering event, and by providing dynamic updates with respect to the same push notification, which can include live and/or recorded event viewing, the monitoring system can be greatly improved.

Accordingly, in one aspect, the invention can provide an improved user experience for an electronic monitoring or surveillance system and/or process in which "rich" push notifications ("PN's") on an application based "computer device", such as a Personal Data Assistant ("PDA"), a smart phone, a tablet, a laptop computer, or a desktop computer, can be operable to advise a user of surveillance system camera activation, identify a cause or causes of the event, whether audio or motion, and even in some applications of the invention to permit a user to view the camera's image without having to take any action other than interacting with the PN. The system may, if desired, be used in a network-based security/surveillance system that detects a triggering event, such as a motion and/or audio detection, to initiate recording. The system can be implemented over a Local Area Network (LAN) or a Wide Area Network (WAN).

In one implementation of a system or process embodying the invention, a sequence could proceed as follows: upon detecting a triggering event, a device, such as a camera, could begin recording and send a PN to a user's computer device that shows a still image recorded at the beginning of the triggering event on a small scale and advising the user that an object, captured in the image, has been detected. In the absence of user interaction during the triggering event, the PN could remain for a time period that may end with a termination of the triggering event or at the end of a preset time period. The PN could then dynamically update to advise the user that a video has been recorded. The dynamically updated PN could remain active until a user taps the PN icon to produce a rich (larger) PN showing a recorded image in which the object which caused the triggering event is highlighted, whereupon the user can tap the PN icon to either view or delete the saved video. Tapping the PN icon during a time period before the dynamic update could produce a rich (larger) PN showing a snapshot of the image with the object which caused the triggering event highlighted, whereupon the user can tap a call-to-action control to watch a live streaming in progress. Multiple PN's could be configured to be generated, with a separate PN being generated per camera/event, whether a single camera detecting multiple events, or multiple cameras detecting the same or multiple events. As a result, the user's experience may be improved by continuous monitoring and rapid viewing through PN's without requiring the overhead of launching/running a dedicated application program. The user need not access any other application during this process. The process can occur entirely through the PN.

Specifically then, one aspect of the present invention provides an electronic monitoring system including: a recording device configured to detect a triggering event including a motion or sound and record an area corresponding to the triggering event; and a controller in communication with the recording device. The controller can execute a program stored in a non-transient medium operable to: send a push notification to a monitoring device upon the recording device detecting a triggering event, in which the push notification is configured to display an alert to the monitoring device configured for a touchscreen I/O, in which the push notification is operable to: (i) indicate detection of a motion or sound; and (ii) provide an image from the recording device. The push notification can be operable to display the alert to the monitoring device while the recording device is still recording the area corresponding to the triggering event.

An area corresponding to a triggering event can be any physical area in which a triggering event occurs and in which a recording device is configured to record upon the triggering event occurring. For example, a field of view of a camera could be an area corresponding to a triggering event, whether the triggering event is detected by the camera, by a motion sensor, or by a microphone. Similarly, a distance within an audible range of a microphone could also be an area corresponding to a triggering event.

Another aspect of the present invention provides a method for electronic monitoring including: (a) detecting a triggering event including a motion or sound; (b) upon detecting the triggering event, using a recording device for recording an area corresponding to the triggering event; and (c) sending a push notification to a monitoring device indicating the triggering event. The push notification can display an alert to the monitoring device configured for a touchscreen I/O. The push notification can be operable to: (i) indicate detection of a motion or sound; and (ii) provide an image from the recording device. The push notification can display the alert to the monitoring device while the recording device is still recording the area corresponding to the triggering event.

These and other features and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

Figure 1:
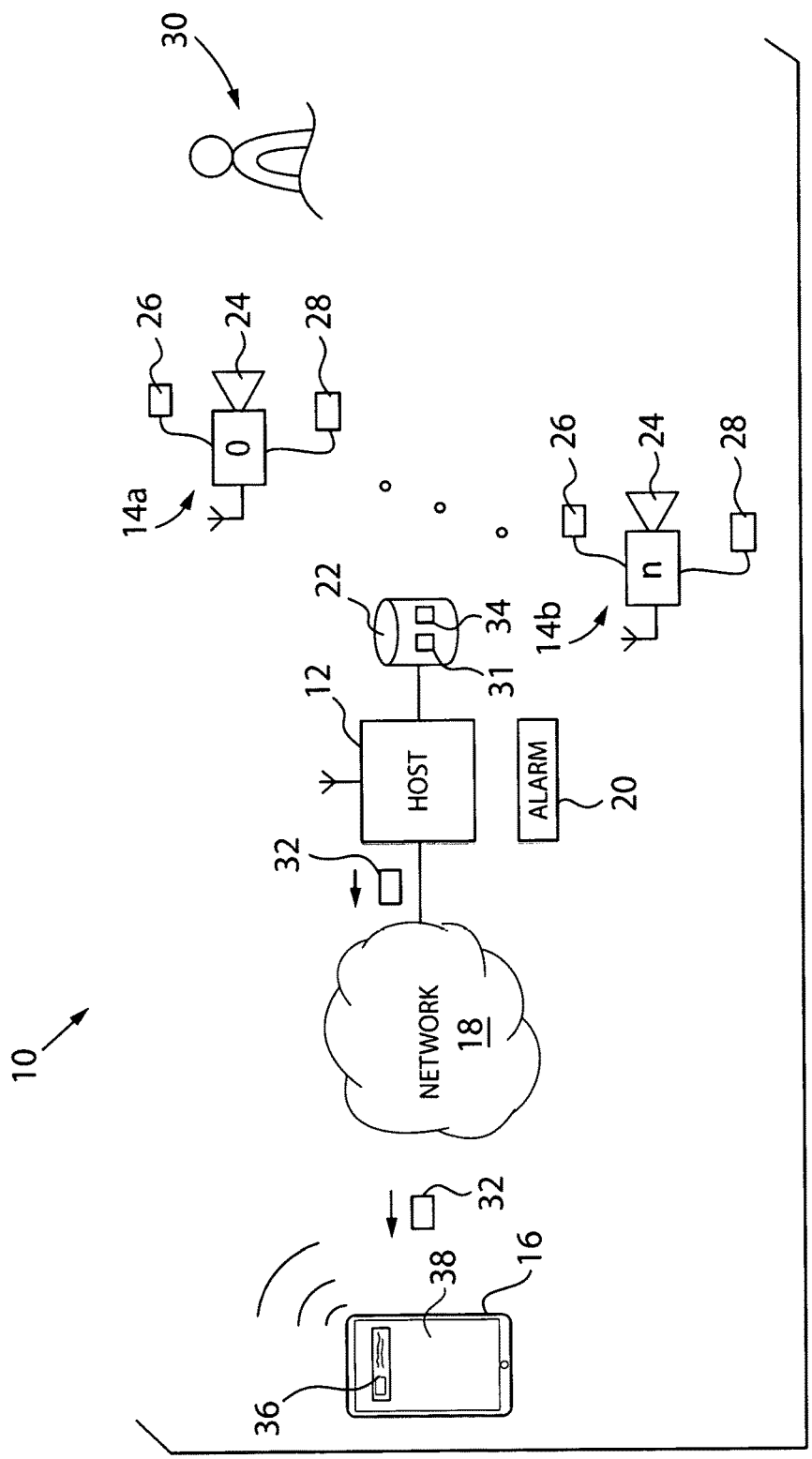
FIG. 1 is a system for electronic monitoring in which detection of a triggering event by a recording device can cause a push notification to be sent to a monitoring device in accordance with an aspect of the invention.

Referring now to FIG. 1, in accordance with an aspect of the invention, an electronic monitoring system 10 can include a host system 12 in communication with one or more recording devices 14, such a first recording device 14*a* (labelled "0") and a second recording device 14*b* (labelled "n"), via a first network, and in communication with one or more monitoring devices, such as a monitoring device 16, via a second network 18. The host system 12 can also communicate with an alarm system 20, which will be further described herein, and a data structure 22 which can be a non-transient medium as known the art for storing a program 31 and recordings 34 as will be further described. Each monitoring device 16 may, for example, be a computing device having a touchscreen display configured for I/O ("Input/Output") 38. It may, for example, be stationary, as in the case of a desk-top computer, or portable, as in the case of a laptop computer or a PDA such as a smart phone or a tablet computer. It is conceivable and even likely that more than one type of monitoring device will be included in the same system. In one embodiment, the first network could be a wired or wireless local area network ("LAN"), such as an IEEE 802.11 Wi-Fi network, and the second network 18 could be a wide area network ("WAN"). However, it will be appreciated that the invention can be implemented with various network configurations, including one in which the host system 12, the recording devices 14 and the monitoring devices 16 are on a single network. Such variations are deemed within the scope of the invention.

Each recording device 14 can be a system including a sensor for sensing a triggering event and/or a recorder for recording a triggering event. For example, recording devices 14 can include one or more of a camera 24, a microphone 26, and/or a motion sensor 28, such as an infrared ("IR") sensor, for sensing and/or recording triggering events, and a communication device for communicating via the first network. Each recording device can be configured to detect a triggering event and act on the detected triggering event. A "triggering event" can be, for example, a person, animal, or object 30 producing a motion or sound in an area being monitored by a recording device 14. In one aspect, a motion of the object 30 can be a triggering event that is detected by the camera 24, which can be detected by comparing captured images and detecting a difference between the images that is representative of motion. In another, non-mutually exclusive aspect, a motion of the object 30 can be a triggering event that is detected by the motion sensor 28, which can be detected by the motion sensor 28 sensing infrared energy emitted by the object 30. In yet another non-mutually exclusive aspect, a sound caused by the object 30 can be a triggering event that is detected by the microphone 26, which can be detected, for example, by monitoring for a sound exceeding a predetermined threshold. Upon detecting a triggering event, the recording device 14 can then record am image of an area corresponding to the triggering event to thereby capture the object 30 producing the triggering event in a recording. The recording device 14 can also communicate the triggering event and the recording to the host system 12 in real time and/or on a delayed basis. The recording can be stored in the recording device 14 and/or can be transmitted and stored in the host system 12, the cloud, and/or any other memory.

The host system 12 can include a microprocessor, a microcontroller or other programmable logic element configured to execute the program 31 stored in the data structure 22. The host system 12 can also include one or more wired or wireless communication devices for communicating via the first and/or second networks, such as Bluetooth, IEEE 802.11 Wi-Fi and/or cellular communication devices. Upon notification by a recording device 14 of a triggering event, the host system 12 can store a recording 34 from the recording device 14 in the data structure 22, and can execute the program 31 to send a push notification ("PN") 32 to one or more monitoring devices 16 for indicating the triggering event. The PN 32 can include preconfigured routing information, and a unique identification number ("UID"), for routing the PN 32 to the monitoring device 16, and for distinguishing one PN from another, respectively. It should be appreciated that a single PN 32 having a UID can be sent based on a recording device 14 detecting a single triggering event. However, multiple PN's 32 having differing UID's can also be sent based on multiple triggering events, such as a recording device 14 detecting multiple triggering events, or multiple recording devices 14 detecting a single or multiple triggering events.

The PN 32, received by the monitoring device 16 with a UID, can be configured to display an alert 36 via the monitoring device 16. The PN 32 can operate as a pop up message pushed to the monitoring device 16 that can be displayed via an operating system of the monitoring device 16 to the touchscreen I/O 38 of the monitoring device 16. This can allow a user to quickly view and/or monitor the triggering event via the PN 32 without requiring the monitoring device 16 to execute a dedicated application program. Accordingly, the PN 32 can be operable to indicate a detection of a motion or sound to the user and provide an image from the recording device. Moreover, the PN 32 can display the alert 36 to the monitoring device 16 while the recording device 14 is still recording the area corresponding to the triggering event. The PN can also cause the monitoring device to transmit another audio and/or visual signal to indicate receipt of the PN at the monitoring device 16. For example, the monitoring device may be configured to produce an audible chirp upon receipt of the PN 32 to bring the user's attention to the alert 36.

Figure 2:
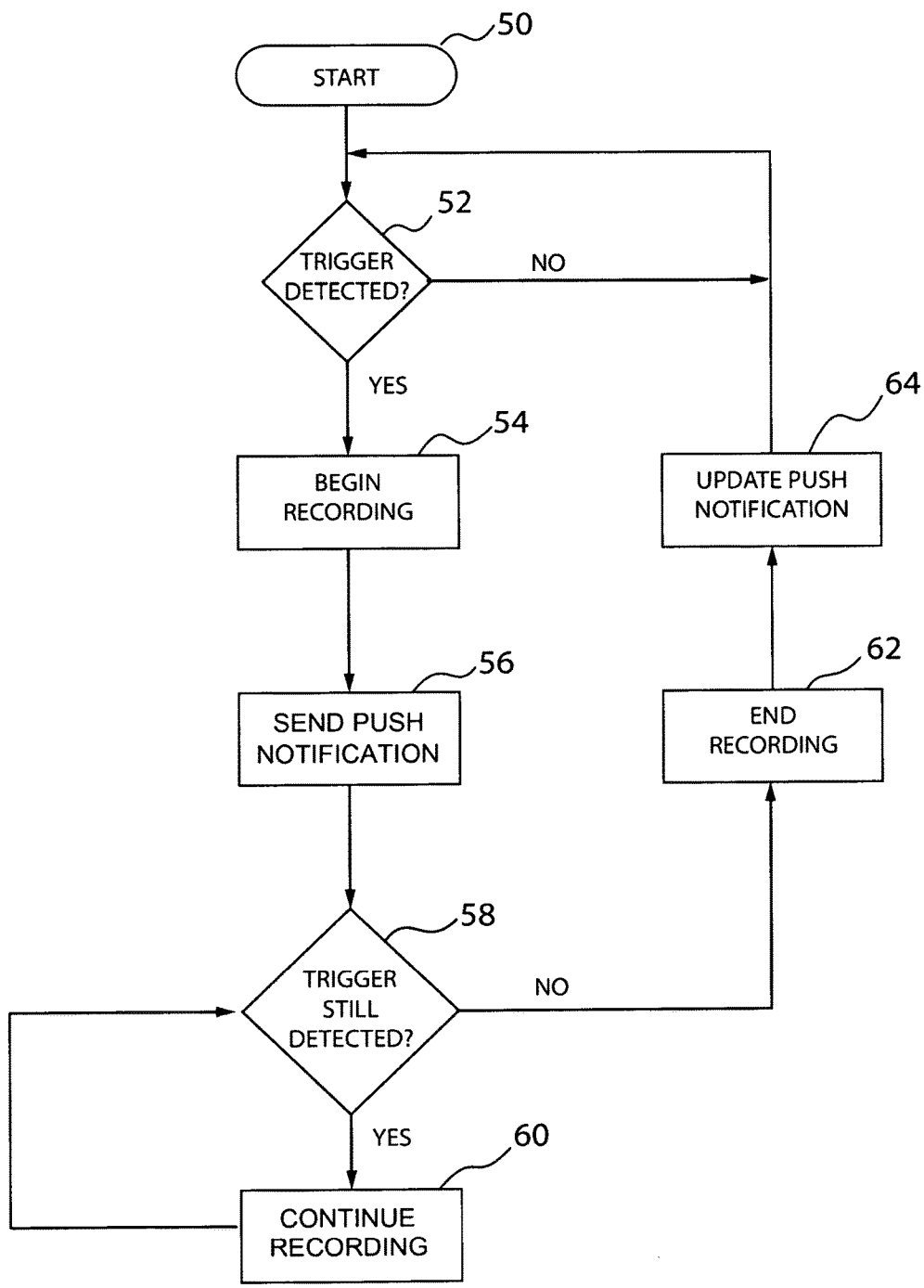
FIG. 2 is a flow chart for control of a host system and recording devices in accordance with an aspect of the invention.

Referring now to FIG. 2, a flow chart for control of the host system 12 and recording devices 14 is provided in accordance with an aspect of the invention. Following initialization of the host system 12 and recording devices 14 at step 50, the recording devices 14 can begin monitoring areas for triggering events at decision step 52. The recording devices 14 can monitor for triggering events, such as motion or sound produced by an object 30, for example, using cameras 24, microphones 26 and/or motion sensors 28, in various configurations, including as described above with respect to FIG. 1. The monitoring without additional action can continue in a continuous loop so long as no triggering events are detected ("No"). However, if a recording device 14 detects a triggering event ("Yes"), the recording device 14 can begin recording the area corresponding to the triggering event at step 54 and transmit a notification to the host system 12. The host system 12, in turn, can send a PN 32 to one or more monitoring devices 16 (to allow for live viewing) at step 56.

Next, at decision step 58, the recording device 14 which detected the triggering event can then determine whether a triggering event is still being detected. In one aspect, this can be accomplished by continuously monitoring for triggering events over a particular frequency, such as every 15 seconds, and concluding that a triggering event is no longer being detected if a triggering event does not occur within the frequency. In another aspect, this can be accomplished by monitoring for a second triggering event after predetermined amount of time, such as 3 minutes, and concluding that a triggering event is no longer being detected if a triggering event does not occur after the predetermined amount of time. If a triggering event is still being detected ("Yes"), the recording device 14 can continue recording at step 60, and can continue in a loop of determining whether a triggering event is still being detected and recording, so long as a triggering event is still being detected. However, if a triggering event is no longer being detected ("No"), the recording device 14 can stop recording at step 62 with a notification to the host system 12, and the host system 12, in turn, can dynamically update the PN 32, to produce an updated PN, to the monitoring device 16 (to allow for recorded viewing) at step 64. Then, the recording devices 14 can continue monitoring areas for triggering events at decision step 52

Figure 3:
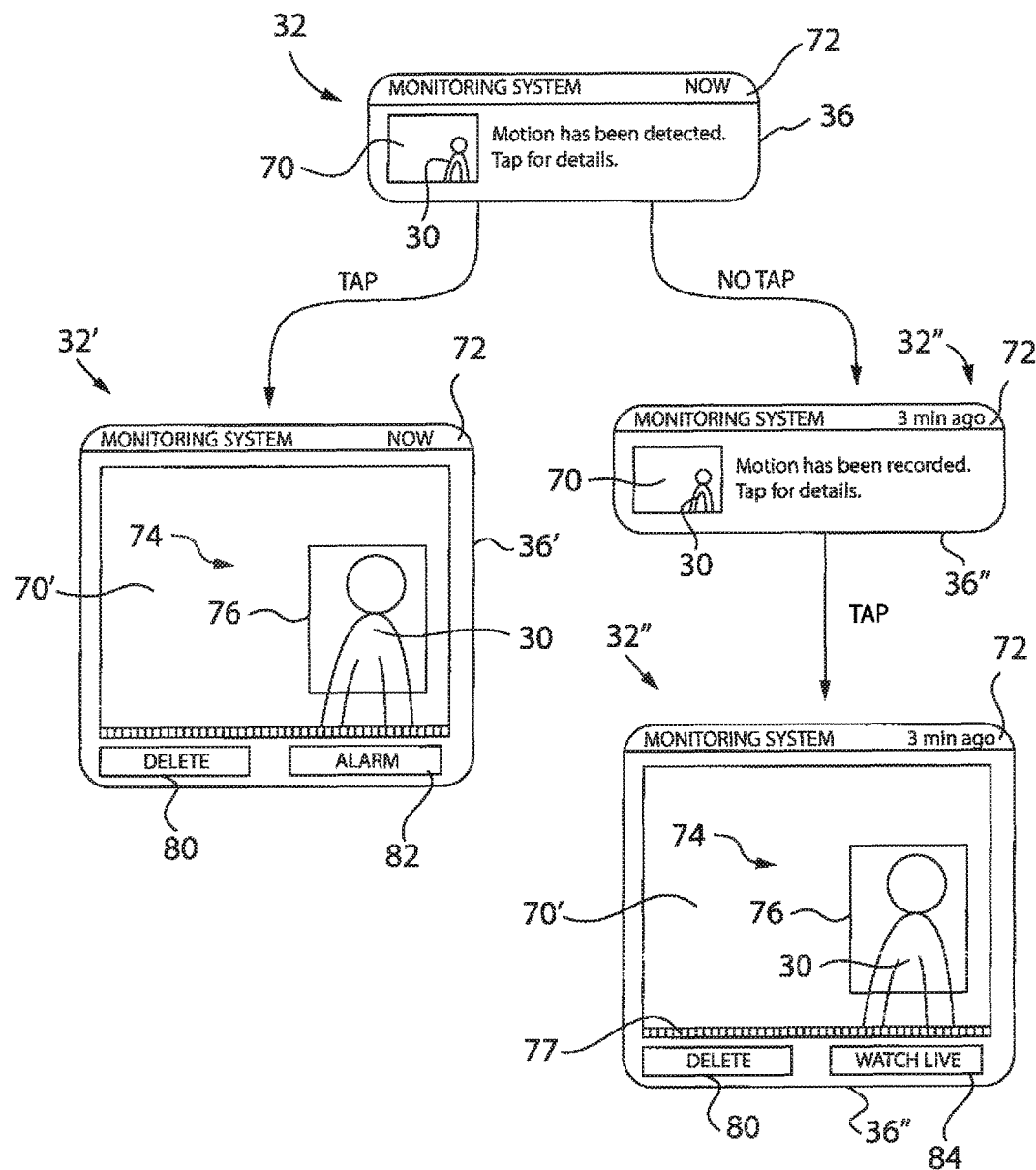
FIG. 3 is a flow chart for a push notification provided to a monitoring device in accordance with an aspect of the invention.

Referring now to FIG. 3, a flow chart for handling a PN 32, as viewed from the touchscreen I/O 38 of a monitoring device 16, is provided in accordance with an aspect of the invention. The flow chart may begin with a PN 32 being sent by a host system 12 to a monitoring device 16. This can occur, for example, upon a recording device 14 initially detecting a motion or sound of a person in a monitored area (the "triggering event"), then the recording device 14 recording the person in the monitored area and sending information about the recording to the host system 12, which, in turn, sends the PN 32. When the host system 12 sends the PN 32 to the monitoring device 16, the PN 32 can appear as a pop-up or scroll-down alert 36 on the touchscreen I/O 38. The PN 32 can indicate detection of a motion (e.g., "Motion has been detected." as illustrated), a sound (e.g., "Sound has been detected."), or a motion and sound (e.g., "Motion and Sound have been detected."), from a recording device 14, in the alert 36. In this example, the PN 32 indicates detection of a motion due to a person moving in the monitored area. The PN 32 can also provide an image 70 from the recording device 14 corresponding to the triggering event, whether produced by motion or sound, such as an initial image from the recording 34 of the person, animal or object 30 in the recording area. Alternatively, the PN 32 can provide a sound clip from the recording device 14 corresponding to the triggering event, whether produced by motion or sound, such as an initial sound from the recording 34 of the person, animal or object 30 in the recording area. In this example, the PN 32 provides an image 70 of the person moving in the monitored area The PN 32 can also indicate a timeframe 72 in which the PN 32 has been delivered, such as "now" or the current actual time when received, such as 3:21 p.m. The PN 32 can also indicate that the user can tap the PN 32, via the touchscreen I/O 38, for more details.

If the user taps the PN 32 during a time period before a dynamic update of the PN 32 occurs, which is a time period in which the recording device 14 is still recording the area corresponding to the triggering event ("Tap"), the PN 32 can be dynamically updated to produce an enhanced PN 32'. As used herein, a "dynamic update" of a PN is an update that is made with respect to a same or common PN, without generating a new or separate PN. A PN can be dynamically updated, for example, by using a same or common UID with respect to a single PN, as described above with respect to FIG. 1. The enhanced PN 32', having the same UID as the PN 32, is an update of the PN 32. The enhanced PN 32' can appear as a larger alert 36', providing a larger version of the image 70' from the recording device 14 corresponding to the triggering event, filling a substantial portion of the alert window, though still allowing for various text and/or control icons to be displayed as will be further described. The enhanced PN 32' can be configured to play/pause/stop a live video stream from the recording device 14 corresponding to the triggering event by tapping a call-to-action control 74. In this example, the PN 32' can play/pause/stop a live video stream of the person moving in the monitored area. The enhanced PN 32' can also be configured to display a marker 76 with respect to the image 70'. The marker 76 may, for example, identify the object 30 as being the object causing the triggering event. The marker could be a box, circle, arrow and/or other geometric feature, which could have a prominent color, such as red, that is overlaid with respect to the object 30 in image, so that the object 30 can be quickly and readily identified by a user in an alert. In this example, the marker 76 can be a box surrounding the person identified as moving in the monitored area. The enhanced PN 32' can also include a delete icon 80, which can operate to stop and delete the recording. The enhanced PN 32' can also include an alarm icon 82, which can operate to activate an alarm, such as the alarm system 20, which could include sounding speakers, flashing lights, sending messages to third parties, and the like.

However, if the user does not tap the PN 32 during the time period before a dynamic update of the PN 32 occurs, which is the time period in which the recording device 14 is still recording the area corresponding to the triggering event ("No Tap"), the PN 32 can be dynamically updated instead to produce an updated PN 32". The updated PN 32", having the same UID as the PN 32, is an update of the PN 32. The updated PN 32" can indicate a completed recording is ready for viewing based on a motion (e.g., "Motion has been recorded." as illustrated), a sound (e.g., "Sound has been recorded."), or a motion and sound (e.g., "Motion and Sound has been recorded."), from the recording device 14, in the alert 36". The updated PN 32" can also provide the image 70 from the recording device 14 corresponding to the triggering event, whether produced by motion or sound, such as an initial image from the recording 34 of the person, animal or object 30 in the recording area. In this example, the updated PN 32" can provide the image 70 corresponding to the person moving in the monitored area at the beginning of the recording. The updated PN 32" can also update the timeframe 72 in which the updated PN 32" has been delivered, such as "3 min. ago." The updated PN 32" can also indicate that the user can tap the updated PN 32", via the touchscreen I/O 38, for more details.

If the user taps the updated PN 32" ("Tap"), the updated PN 32" can be dynamically updated again to produce an enhanced PN 32'". The enhanced PN 32'", having the same UID as the PN 32" and the PN 32, is an update of the PN 32" and the PN 32. The enhanced PN 32'" can appear as a larger alert 36'", providing the larger version of the image 70' from the recording device 14 corresponding to the triggering event. The enhanced PN 32'" can be configured to play/pause/stop a recording from the recording device 14 corresponding to the triggering event by tapping the call-to-action control 74 to begin play, tapping the call-to-action control 74 again to pause play, and/or double tapping the call-to-action control 74 to stop play and reset to the first frame. The enhanced PN 32'" can also include a frame history bar 77 for allowing a user to quickly navigate through the recording, forward or backward in time, to a particular frame of interest. The enhanced PN 32'" can also be configured to display the marker 76 with respect to the image 70'. The marker 76 can identify the object 30 as being the object causing the triggering event. The enhanced PN 32'" can also include the delete icon 80, which can operate to delete the recording. The enhanced PN 32'" can also include a watch live icon 84, which can operate to switch to a live video stream view of the recording device 14 corresponding to the triggering event.

Figure 4:
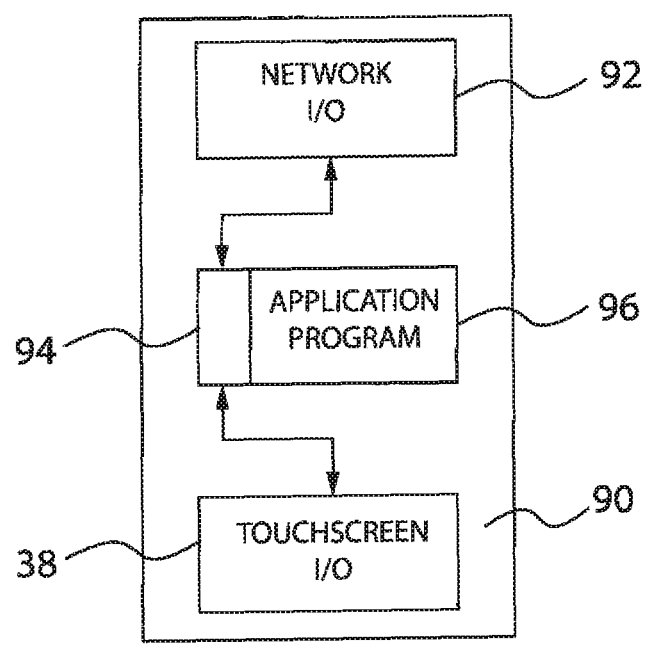
FIG. 4 is an exemplar I/O path for a push notification at a monitoring device in accordance with an aspect of the invention.

Referring now to FIG. 4, an exemplar I/O path for the PN 32 at the monitoring device 16 is provided in accordance with an aspect of the invention. The monitoring device 16 can operate with an operating system 90 configured to support basic functions of the monitoring device 16, such as scheduling tasks, executing applications and controlling peripherals. To improve response rate, efficiency and/or reliability, the PN 32 can be configured to route from a network I/O 92, which could be a wired or wireless communication device of the monitoring device 16 for communicating via the second network 18, to the touchscreen I/O 38, via a push notification handler ("PN handler") 94 of a dedicated application program 96. The application program 96 can provide such features, for example, as a customized Graphical User Interface ("GUI") display, system configuration information, such as for the host system 12 and/or recording devices 14, system resources, support and/or help information, libraries, links, and the like. The PN handler 94 can be configured to route the PN 32, dynamic updates of the PN 32, data corresponding to the PN 32, such a live video streaming, recordings, and/or markers, and taps by the user, between the network I/O 92 and the touchscreen I/O 38, as pop-up messages with respect to the operating system 90, without requiring the monitoring device 16 to fully execute the application program 96. Accordingly, the PN handler 94 can avoid the potential delay, inefficiency and/or unreliability of fully executing aspects of the application program 96, such as the GUI, system configuration, system resources, support and/or help information, libraries, links, and the like, thereby providing significant improvement.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

It should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

What is claimed is:

1. An electronic monitoring system comprising:
    a recording device configured to detect a triggering event comprising at least one of a motion and sound and to record an area corresponding to the triggering event; and
    a controller in communication with the recording device, the controller executing a program stored in a non-transient medium and operable to send a push notification to a monitoring device upon the recording device detecting a triggering event, the monitoring device including an operating system and an application program for interacting with the recording device for monitoring a triggering event, wherein the push notification is configured to display an alert to the monitoring device configured for a touchscreen I/O, wherein the push notification is operable to:
    (i) indicate detection of at least one of a motion and sound; and
    (ii) provide an image from the recording device,
    wherein the controller configures the push notification to display the alert to the monitoring device while the recording device is still recording the area corresponding to the triggering event, and
    wherein the push notification is configured to display the alert to the monitoring device through the operating system by a push notification handler without fully executing the application program.

2. The system of claim 1, wherein the controller is additionally configured to dynamically update the push notification to produce an enhanced push notification providing a larger version of the image.

3. The system of claim 2, wherein the controller is additionally configured to cause the enhanced push notification to play a live video stream from the recording device.

4. The system of claim 2, wherein the controller is additionally configured to cause the enhanced push notification to display a marker with respect to the image, the marker identifying an object causing the triggering event.

5. The system of claim 1, wherein the controller is additionally configured to dynamically update the push notification to produce an updated push notification indicating a complete recording corresponding to the image from the recording device is available for viewing.

6. The system of claim 5, wherein the controller is additionally configured to dynamically update the updated push notification to produce an enhanced push notification providing a larger version of the image, the enhanced push notification being configured to: (a) play the complete recording; and (b) delete the complete recording.

7. The system of claim 1, wherein the controller communicates with the recording device via a first network and communicates with the monitoring device via a second network.

8. The system of claim 7, wherein the recording device comprises at least one of a camera and a microphone, and additionally comprises a communication device for communicating via the first network.

9. A method for electronic monitoring, comprising:
(a) detecting a triggering event comprising at least one of a motion and sound;
(b) upon detecting the triggering event, using a recording device for recording an area corresponding to the triggering event; and
(c) sending a push notification to a monitoring device indicating the triggering event, the monitoring device including an operating system and an application program for interacting with the recording device for monitoring a triggering event, wherein the push notification is configured to display an alert to the monitoring device configured for a touchscreen I/O, wherein the push notification is operable to:
(i) indicate detection of at least one of a motion and sound; and
(ii) provide an image from the recording device, and
wherein the push notification is configured to display the alert to the monitoring device while the recording device is still recording the area corresponding to the triggering event, and
wherein the push notification is configured to display the alert to the monitoring device through the operating system by a push notification handler without fully executing the application program.

10. The method of claim 9, further comprising, upon selecting the push notification, dynamically updating the push notification to produce an enhanced push notification providing a larger version of the image.

11. The method of claim 10, further comprising playing a live video stream from the recording device in the enhanced push notification.

12. The method of claim 10, further comprising identifying an object causing the triggering event, and displaying a marker with respect to the larger version of the image for identifying the object.

13. The method of claim 9, further comprising stopping the recording after a predetermined amount of time.

14. The method of claim 9, wherein the triggering event is a first triggering event, and further comprising stopping the recording upon failing to detect a second triggering event after a predetermined amount of time.

15. The method of claim 9, further comprising stopping the recording and dynamically updating the push notification to produce an updated push notification indicating a complete recording from the recording device is available for viewing.

16. The method of claim 15, further comprising, upon selecting the updated push notification, dynamically updating the updated push notification to produce an enhanced push notification providing a larger version of the image.

17. The method of claim 16, further comprising playing the complete recording in the enhanced push notification.

18. The method of claim 16, further comprising deleting the complete recording via the enhanced push notification.

19. The method of claim 17, further comprising detecting the triggering event using a motion sensor.

20. The method of claim 9, wherein the recording device is a camera, and further comprising detecting the triggering event by comparing frames captured by the camera.

* * * * *